US007983223B2

(12) United States Patent
Jung et al.

(10) Patent No.: US 7,983,223 B2
(45) Date of Patent: Jul. 19, 2011

(54) APPARATUS AND METHOD FOR REPORTING CHANNEL QUALITY INDICATOR IN WIRELESS COMMUNICATION SYSTEM

(75) Inventors: Young-Seok Jung, Suwon-si (KR); Kwang-Man Ok, Hwaseong-si (KR); Chae-Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 12/273,293

(22) Filed: Nov. 18, 2008

(65) Prior Publication Data

US 2009/0129284 A1 May 21, 2009

(30) Foreign Application Priority Data

Nov. 20, 2007 (KR) .......................... 10-2007-0118495

(51) Int. Cl.
*H04W 4/00* (2009.01)
*H04K 1/00* (2006.01)
*H04L 27/28* (2006.01)
(52) U.S. Cl. ........................ 370/332; 375/260
(58) Field of Classification Search .................. None
See application file for complete search history.

(56) References Cited

U.S. PATENT DOCUMENTS

| | | | | |
|---|---|---|---|---|
| 5,654,982 A | * | 8/1997 | Goodson et al. | 375/222 |
| 2005/0201295 A1 | * | 9/2005 | Kim et al. | 370/241 |
| 2008/0004030 A1 | * | 1/2008 | Frederiksen et al. | 455/450 |
| 2008/0298482 A1 | * | 12/2008 | Rensburg et al. | 375/260 |
| 2009/0042511 A1 | * | 2/2009 | Malladi | 455/62 |
| 2009/0061778 A1 | * | 3/2009 | Vrzic et al. | 455/62 |
| 2009/0109909 A1 | * | 4/2009 | Onggosanusi et al. | 370/329 |
| 2009/0116570 A1 | * | 5/2009 | Bala et al. | 375/260 |

FOREIGN PATENT DOCUMENTS

| KR | 10-2007-0014895 A | 2/2007 |
|---|---|---|
| KR | 10-0736728 B1 | 7/2007 |

* cited by examiner

*Primary Examiner* — Xavier Szewai Wong
(74) *Attorney, Agent, or Firm* — Jefferson IP Law, LLP

(57) ABSTRACT

An apparatus and method for reporting a Channel Quality Indicator (CQI) in a wireless communication system are provided. The method includes estimating a per-subband CQI with respect to each transport layer and generating a broadband CQI with respect to each transport layer according to the per-subband CQI, comparing the broadband CQI and the per-subband CQI with respect to each transport layer to determine a difference value thereof, determining an offset value to be used in a differential CQI, determining the differential CQI by subtracting the offset value from the determined difference value, and transmitting a transmission symbol by converting the determined differential CQI into the transmission symbol.

17 Claims, 6 Drawing Sheets

OUTAGE PROBABILITY OF DIFFERENTIAL
CQI WITH RESPECT TO OFFSET
(NUMBER OF ALL SUBBANDS: 10, NUMBER OF SUBBANDS TO BE REPORTED: 2)

OUTAGE PROBABILITY OF DIFFERENTIAL
CQI WITH RESPECT TO OFFSET
(NUMBER OF ALL SUBBANDS: 10, NUMBER OF SUBBANDS TO BE REPORTED: 4)

APPARATUS AND METHOD FOR REPORTING CHANNEL QUALITY INDICATOR IN WIRELESS COMMUNICATION SYSTEM

PRIORITY

This application claims the benefit under 35 U.S.C. §119(a) of a Korean patent application filed in the Korean Intellectual Property Office on Nov. 20, 2007 and assigned Serial No. 10-2007-0118495, the entire disclosure of which is hereby incorporated by reference.

BACKGROUND OF THE INVENTION

1. Field of the Invention

The present invention relates to a method of reporting a Channel Quality Indicator (CQI) in a wireless communication system. More particularly, the present invention relates to an apparatus and method for reducing an amount of CQI to be delivered from a receiving end to a transmitting end.

2. Description of the Related Art

In general, a wireless communication system uses Adaptive Modulation and Coding (AMC) to improve spectral efficiency by adaptively changing a modulation order and an error correction code with respect to a channel between transmitting and receiving ends. Further, scheduling is performed by considering a channel state between a Base Station (BS) and a Mobile Station (MS) to improve a system throughput when the channel is allocated to the MS. For this purpose, a Channel Quality Indicator (CQI) estimated in the receiving end needs to be delivered to the transmitting end.

In broadband Orthogonal Frequency Division Multiple Access (OFDMA), the AMC and the scheduling are performed for each subband by utilizing a characteristic of a frequency selective channel. A subband generally denotes a basic unit for maintaining a channel quality characteristic. In this case, a per-subband CQI needs to be delivered from the receiving end to the transmitting end, and thus a signaling overhead caused by CQI delivery is increased. As a result, channel resources are wasted.

Accordingly, there is a need for an effective CQI transmission method capable of reducing the signaling overhead while transmitting a CQI sufficient to effectively perform the AMC and the scheduling.

FIG. 1 is a flowchart illustrating a process of generating a time-domain differential CQI in a conventional receiving apparatus.

Referring to FIG. 1, the receiving apparatus estimates a per-subband CQI with respect to each transport layer in step 101, and generates a broadband CQI according to the estimated per-subband CQI in step 103. The broadband CQI may be a representative CQI for a whole system band. Further, the broadband CQI may be a representative CQI for a band excluding subbands in which CQIs are individually delivered for scheduling, or may be a representative CQI for a subset of the band.

In step 105, with respect to each transport layer, the receiving apparatus reads the per-subband CQI and the broadband CQI from a memory in which the CQIs are stored. Herein, the read per-subband CQI and broadband CQI are those most recently delivered to a transmitting end to which a reference signal for encoding a differential CQI is transmitted. In step 107, the receiving apparatus compares the per-subband CQI and the broadband CQI, which are estimated in steps 101 and 103, and the per-subband CQI and the broadband CQIs which are read in step 105, and then obtains difference values thereof. In this case, if the per-subband CQI and the broadband CQI, which are most recently delivered to the transmitting end with respect to each transport layer, do not exist in a subband, a reference value of the subband can be replaced with either a broadband CQI value or a selected CQI value that is obtained when the subband is last selected.

In step 109, the receiving apparatus quantizes the difference value between the per-subband CQI and the broadband CQI, encodes the quantized difference value, and converts the encoded difference value into a bit-stream. In step 111, the receiving apparatus converts a differential CQI, which is converted into the bit-stream, into a transmission symbol, and transmits the converted transmission symbol to the transmitting end. When the difference value between the per-subband CQI and the broadband CQI is quantized and encoded to generate the bit-stream, mapping of Table 1 or Table 2 below is used. A scheme having a constant resolution, as shown in Table 1, is generally used. A scheme having a multiple resolution, as shown in Table 2, is used when a range of the differential CQI is large. In the selection of mapping, the mapping can be adaptively changed according to a channel characteristic. Thereafter, the procedure of FIG. 1 ends.

TABLE 1

| Differential CQI | Bit-stream |
| --- | --- |
| −8 | 1000 |
| −7 | 1001 |
| −6 | 1010 |
| −5 | 1011 |
| −4 | 1100 |
| −3 | 1101 |
| −2 | 1110 |
| −1 | 1111 |
| 0 | 0000 |
| 1 | 0001 |
| 2 | 0010 |
| 3 | 0011 |
| 4 | 0100 |
| 5 | 0101 |
| 6 | 0110 |
| 7 | 0111 |

TABLE 2

| Differential CQI | Bit-stream |
| --- | --- |
| 5 | 1000 |
| 7 | 1001 |
| 9 | 1010 |
| 11 | 1011 |
| −6 | 1100 |
| −8 | 1101 |
| −10 | 1110 |
| −12 | 1111 |
| 0 | 0000 |
| 1 | 0001 |
| 2 | 0010 |
| 3 | 0011 |
| −4 | 0100 |
| −3 | 0101 |
| −2 | 0110 |
| −1 | 0111 |

FIG. 2 is a flowchart illustrating a process of generating a spatial-domain differential CQI in a conventional receiving apparatus.

Referring to FIG. 2, the receiving apparatus estimates a per-subband CQI with respect to each transport layer in step 201, and generates a broadband CQI according to the estimated per-subband CQI in step 203.

In step 205, for the encoding of the spatial-domain differential CQI, the receiving apparatus selects a reference transport layer for the per-subband CQI and the broadband CQI. In step 207, the receiving apparatus compares a per-subband CQI and a broadband CQI of the selected reference transport layer and a per-subband CQI and a broadband CQI of another transport layer, and thus obtains difference values thereof.

In step 209, the receiving apparatus quantizes the difference value of the per-subband CQI and the broadband CQI, encodes the quantized difference value, and converts the encoded difference value into a bit-stream. In step 211, the receiving apparatus converts a differential CQI, which is converted into the bit-stream, into a transmission symbol, and transmits the converted transmission symbol to a transmitting end. Thereafter, the procedure of FIG. 2 ends.

A signaling overhead caused by the spatial-domain differential CQI is larger in comparison with the case of the time-domain differential CQI. This is because at least one transport layer does not transmit a differential CQI with respect to the selected per-subband CQI and the selected broadband CQI. The increased overhead of the spatial-domain differential CQI can be reduced when the time-domain differential CQI is applied for the reference transport layer.

As described above, an amount of the signaling overhead can be reduced in the aforementioned method employing the differential CQI. However, the amount of signaling overhead cannot be expected to be decreased in the case of the time-domain differential CQI since a correlation value of a time-domain CQI is decreased in proportion to the speed of an MS, which results in the increase of a differential CQI range. In the case of the spatial-domain differential CQI, if a CQI correlation between transport layers is small, an overhead reduction effect is smaller in comparison with a method employing the time-domain differential CQI. In addition, in a case where a Forward Error Correction (FEC) output is allowed to pass a plurality of transport layers so that a correlation increases between transport layers, channel adaptability is decreased, and thus there is a problem in that maximization of transmission efficiency achieved through CQI transmission is limited. Therefore, a need exists for an improved apparatus and method for reporting a CQI indicator.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reporting a Channel Quality Indicator (CQI) in a wireless communication system.

Another aspect of the present invention is to provide an apparatus and method for reporting a CQI having a low signaling overhead in an Orthogonal Frequency Division Multiple Access (OFDMA) system using multiple Transmit (Tx)/Receive (Rx) antennas.

Another aspect of the present invention is to provide an apparatus and method for generating a differential CQI irrespective of the speed of a Mobile Station (MS) and a correlation value between transport layers in an OFDMA system using multiple Tx/Rx antennas.

In accordance with an aspect of the present invention, a method of generating a CQI in a receiving apparatus of a wireless communication system is provided. The method includes estimating a per-subband CQI with respect to each transport layer and generating a broadband CQI with respect to each transport layer according to the per-subband CQI, comparing the broadband CQI and the per-subband CQI with respect to each transport layer to determine a difference value thereof, determining an offset value to be used in a differential CQI, determining the differential CQI by subtracting the offset value from the determined difference value, and transmitting a transmission symbol by converting the determined differential CQI into the transmission symbol.

In accordance with another aspect of the present invention, a receiving apparatus for generating a CQI in a wireless communication system is provided. The apparatus includes a CQI estimator for generating a broadband CQI with respect to each transport layer according to a per-subband CQI by estimating the per-subband CQI with respect to each transport layer, for comparing the broadband CQI and the per-subband CQI with respect to each transport layer to determine a difference value thereof, and for determining a differential CQI by determining an offset value to be used in the differential CQI, and a CQI generator for generating a CQI to be transmitted to a transmitting end by using the determined differential CQI.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an exemplary apparatus and method for generating a differential Channel Quality Indicator (CQI) irrespective of the speed of a Mobile Station (MS) and a correlation value between transport layers in an Orthogonal Frequency Division Multiple Access (OFDMA) system using multiple Transmit (Tx)/Receive (Rx) antennas will be described.

It will be assumed hereinafter that n subbands are used in an OFDMA system in which k users exist. The subband denotes a basic unit of CQI transmission. In general, the subband is a unit having the same modulation order and the same error correction code rate in a system using Adaptive Modulation and Coding (AMC), or is a channel unit allocated to one user in scheduling.

Figure 1:
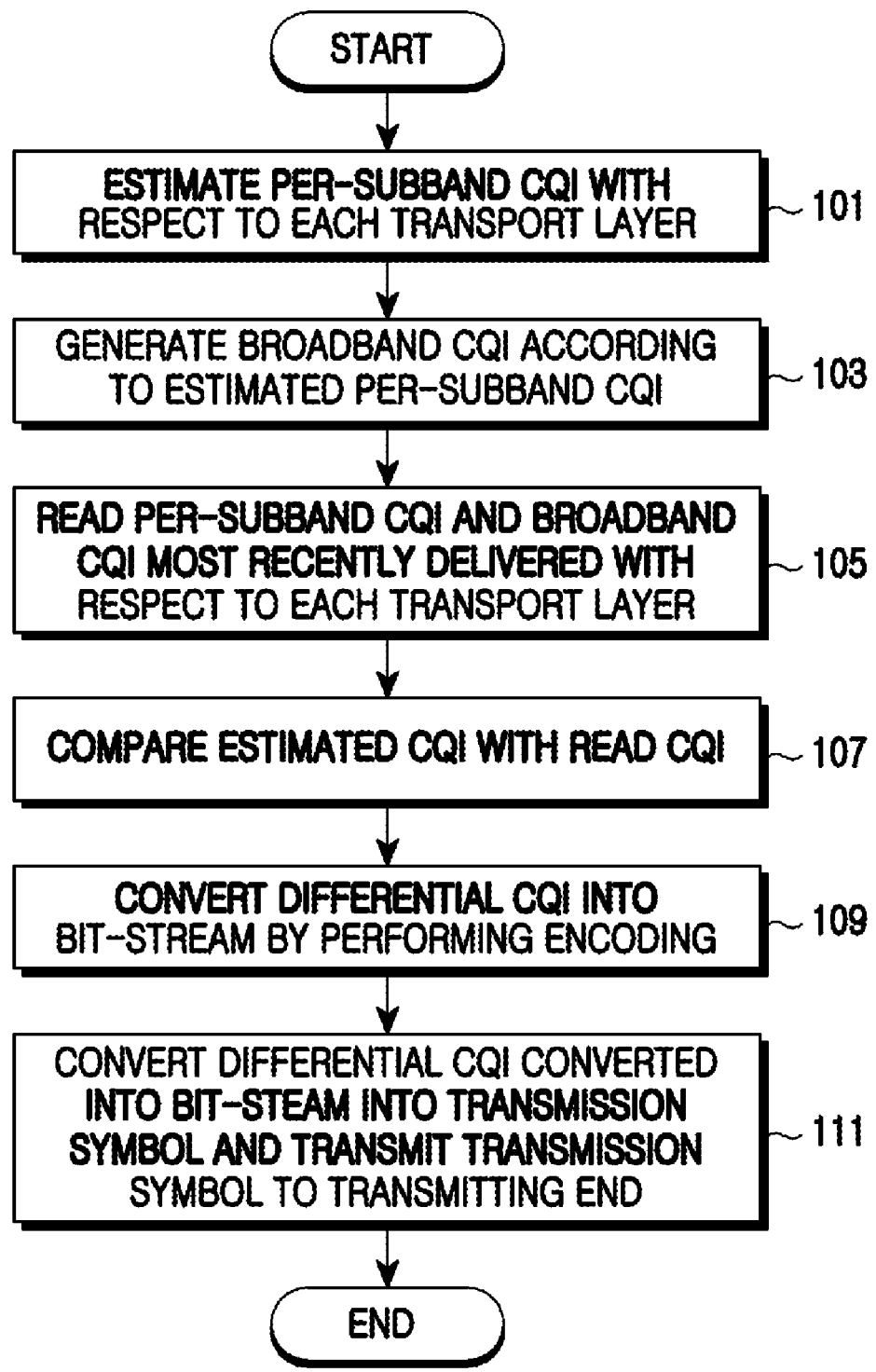
FIG. 1 is a flowchart illustrating a process of generating a time-domain differential Channel Quality Indicator (CQI) in a conventional receiving apparatus.
Figure 2:
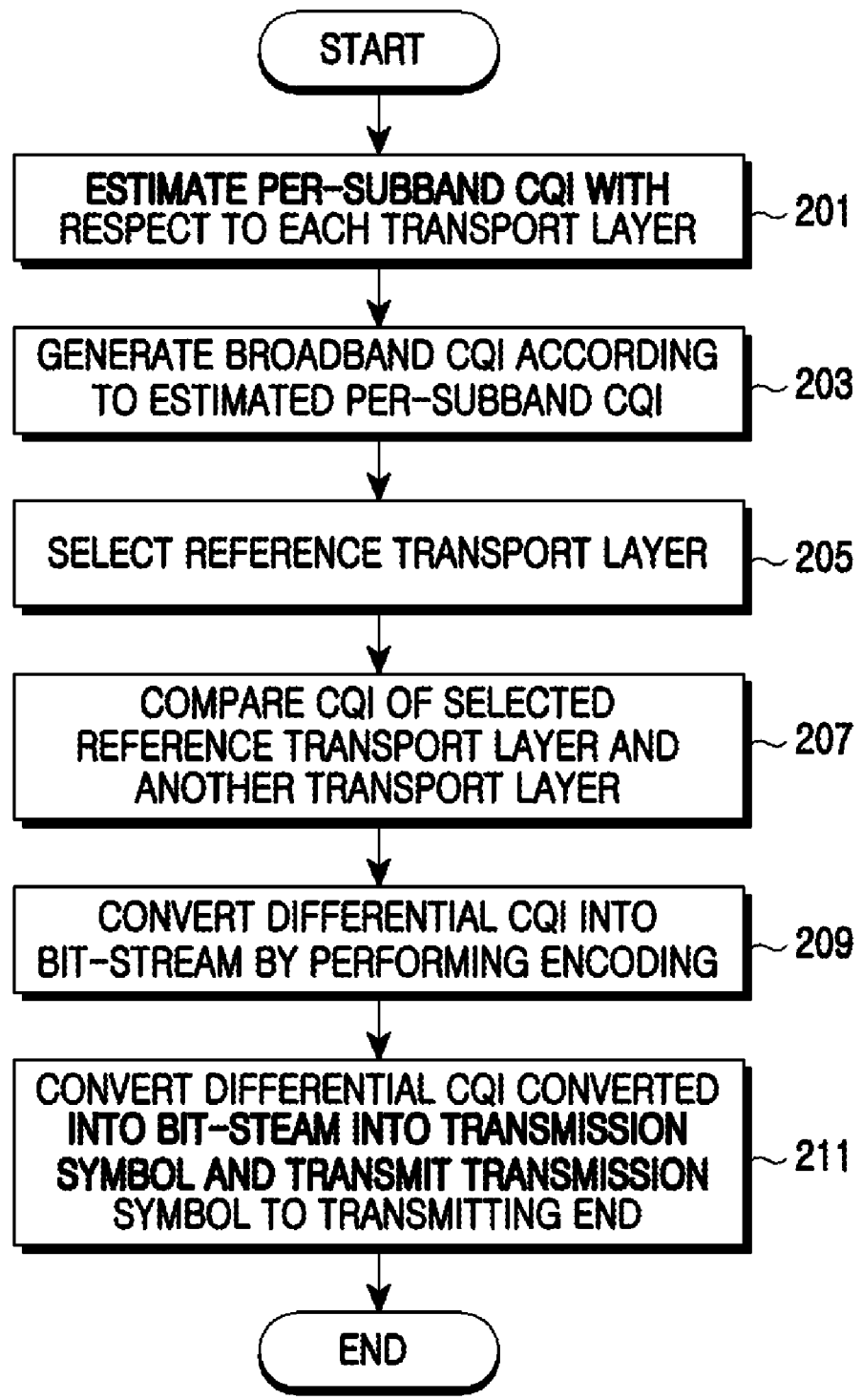
FIG. 2 is a flowchart illustrating a process of generating a spatial-domain differential CQI in a conventional receiving apparatus.
Figure 3:
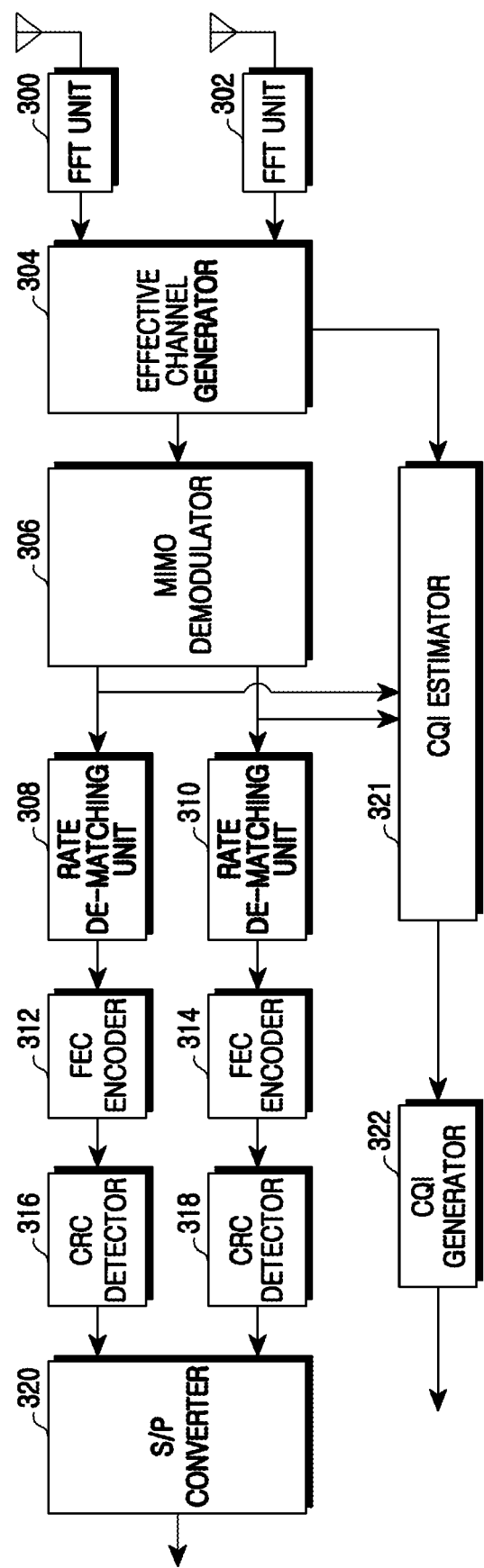
FIG. 3 is a block diagram illustrating a receiving apparatus for generating a CQI in a wireless communication system according to an exemplary embodiment of the present invention.

FIG. 3 is a block diagram illustrating a receiving apparatus for generating a CQI in a wireless communication system according to an exemplary embodiment of the present invention.

Referring to FIG. 3, the receiving apparatus includes Fast Fourier Transform (FFT) units 300 and 302, an effective channel generator 304, a Multiple Input Multiple Output (MIMO) demodulator 306, rate de-matching units 308 and 310, Forward Error Correction (FEC) encoders 312 and 314, Cyclic Redundancy Check (CRC) detectors 316 and 318, a Serial-to-Parallel (S/P) converter 320, a CQI estimator 321, and a CQI generator 322.

The FFT units 300 and 302 convert time-domain signals received from respective Rx antennas into frequency-domain signals, and output the frequency-domain signals to the effective channel generator 304.

The effective channel generator 304 applies an effect of precoding to a channel. The precoding is not applied when a reference signal used in channel estimation is commonly used by MSs. Thus, a receiving end applies the effect of precoding to an estimated channel value. On the other hand, the effective channel generator 304 is unnecessary if a dedicated reference signal is permitted for channel estimation, that is, if transmission is made in a state where precoding is applied to a reference signal allocated to each user.

The MIMO demodulator 306 generates a Log-Likelihood Ratio (LLR) value by using an effective channel and a received signal, and outputs the generated LLR value to the rate de-matching units 308 and 310.

Thereafter, rate de-matching is performed on the LLR value input to the rate de-matching units 308 and 310. Then, the LLR value is delivered to and encoded by the FEC encoders 312 and 314. The encoded information bit is delivered to the CRC detectors 316 and 318 to detect an error and to determine whether retransmission is required. If no error is detected, the information bit is delivered to an upper layer through the S/P converter 320.

The CQI estimator 321 estimates a per-subband CQI with respect to each transport layer, and generates a broadband CQI according to the estimated per-subband CQI. The CQI estimator 321 compares the broadband CQI and the selected per-subband CQI with respect to each transport layer and determines a difference value thereof. Further, the CQI estimator 321 determines an offset value to be used in a differential CQI by considering the number of all subbands, the number of subbands to be reported, and a channel characteristic, and then subtracts the determined offset value from the determined difference value. Then, the CQI estimator 321 quantizes and encodes the result value of the subtraction operation to generate a bit-stream. The CQI estimator 321 determines the differential CQI according to Equation (1) below.

$$\text{Differential CQI of selected subband}=\text{CQI of selected subband}-\text{broadband CQI}-\text{offset} \quad (1)$$

The CQI estimator 321 outputs the CQI determined using Equation (1) above to the CQI generator 322.

The CQI generator 322 uses the received the CQI to generate a CQI to be transmitted to a transmitting end.

Figure 4:
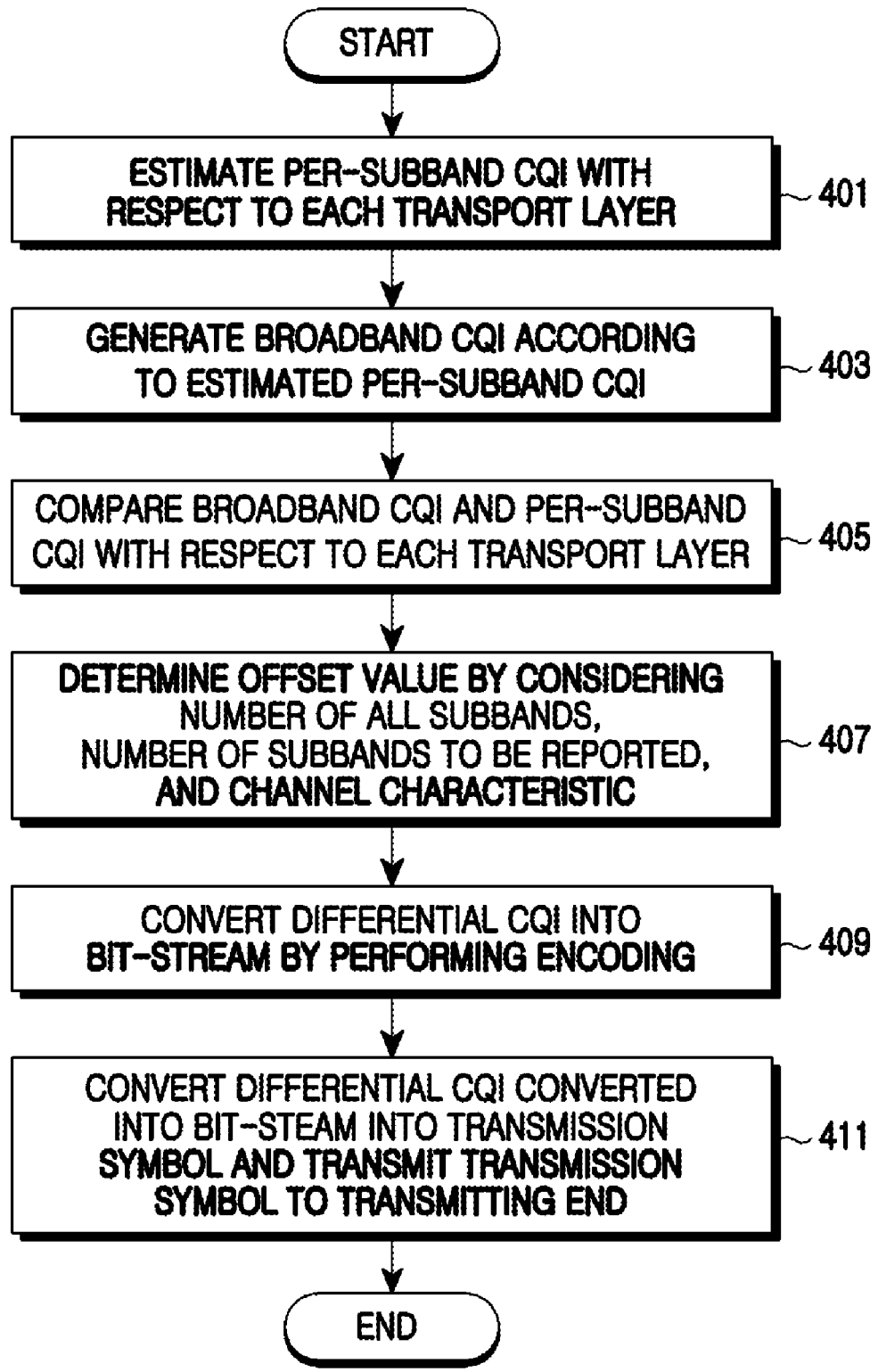
FIG. 4 is a flowchart illustrating a process of generating a differential CQI of a broadband CQI reference using an offset according to an exemplary embodiment of the present invention.

FIG. 4 is a flowchart illustrating a process of generating a differential CQI of a broadband CQI reference using an offset according to an exemplary embodiment of the present invention.

Referring to FIG. 4, a receiving apparatus estimates a per-subband CQI with respect to each transport layer in step 401, and generates a broadband CQI according to the estimated per-subband CQI in step 403. The broadband CQI may be a representative CQI for an entire system band. Further, the broadband CQI may be a representative CQI for a band excluding subbands in which CQIs are individually delivered for scheduling, or may be a representative CQI for a subset of the band. In addition, a value that represents a throughput (i.e., a Signal-to-Interference and Noise Ratio (SINR) or a Modulation and Coding Scheme (MCS) level, etc.) of a band and that is related to a CQI (e.g., an average value of subband CQIs or a median value thereof) is selected as the representative CQI.

In step 405, the receiving apparatus compares the broadband CQI and the selected per-subband CQI with respect to each transport layer to determine a difference value thereof. In step 407, the receiving apparatus determines an offset value to be used in a differential CQI by considering the number of all subbands, the number of subbands to be reported, a channel characteristic, etc. The offset value may vary depending on each transport layer. Herein, the offset value is determined so that the value can reduce a range of the differential CQI of the subband to be reported.

For example, assume that there are 10 subbands, each of which has the same average Signal to Noise Ratio (SNR) value, and CQIs of subbands having first and second highest SNR values and an average value of all subbands are reported. It is also assumed that a subband channel conforms to a complex Gaussian distribution in which a channel correlation of adjacent subbands is ρ and an average is 0. Further, it is assumed that −4~3 dB can be expressed if a differential CQI is expressed with 3 bits at a resolution of 1 dB.

Figure 6A:
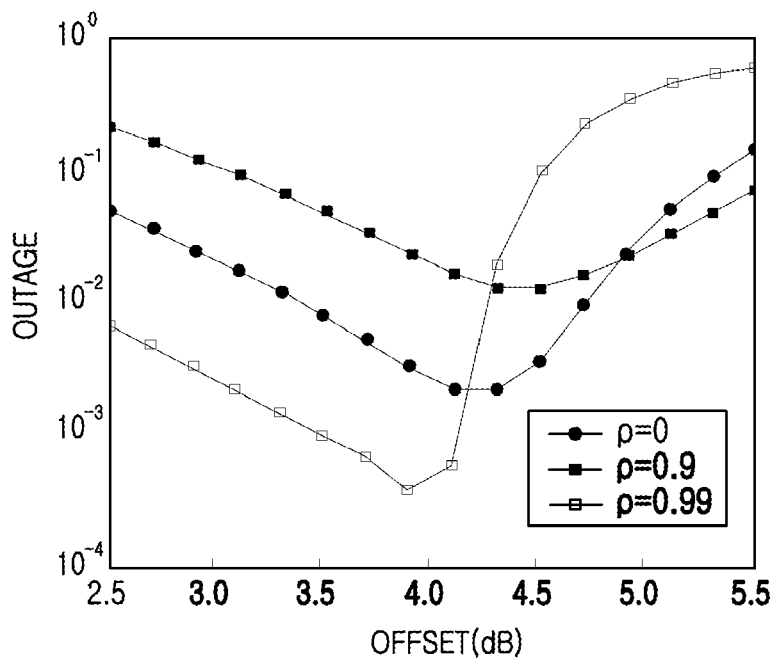
FIGS. 6A and 6B are graphs illustrating an outage probability of a differential CQI according to an exemplary embodiment of the present invention.

FIG. 6A is a graph illustrating an outage probability of a differential CQI according to an exemplary embodiment of the present invention, specific to a channel correlation. The outage probability of the differential CQI denotes a probability in which a differential CQI to be actually reported exists outside a range that can be expressed with 3 bits. Referring to FIG. 6A, the outage probability of the differential CQI is below 2% when a proper offset is selected in each channel correlation. If it is considered that about 5 bits (i.e., −5~25 dB) are required to express an SNR of an operation range at a resolution of 1 dB, then 15 bits are required in the case of not applying the differential CQI, whereas only 11 bits are required in the case of applying the differential CQI. Therefore, it can be seen that an amount of overhead required for CQI reporting is decreased by 27%.

The graph of FIG. 6A also shows existence of an offset value (i.e., offset=4.2 dB) robust to channel correlation. The offset value (e.g., the number of all subbands, the number of subbands to be reported, a subband probability distribution, etc.) can vary along with changes in a presumed channel probability distribution. Thus, an additional signaling overhead is required for offset information. However, the additional signaling overhead is generally less frequently produced than CQI-related signaling.

Figure 6B:
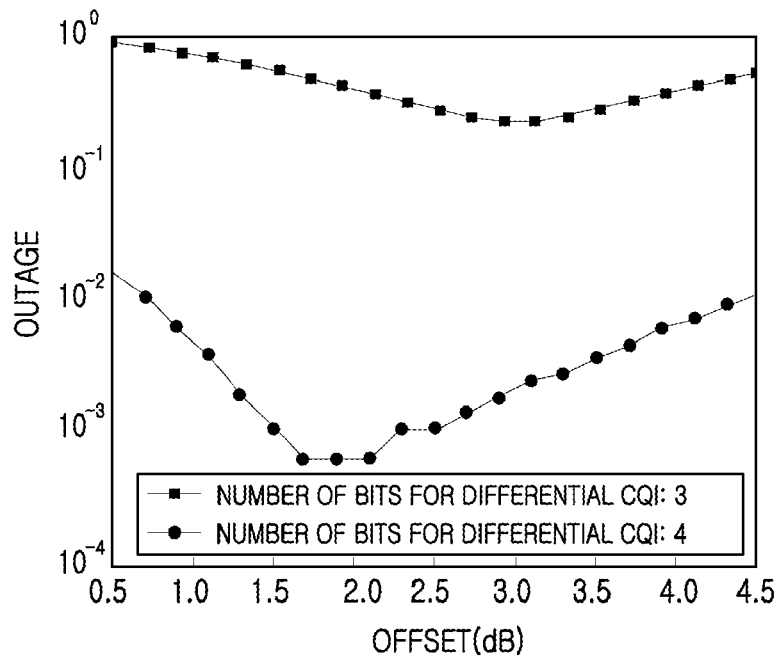

FIG. 6B is a graph illustrating an outage probability of a differential CQI according to an exemplary embodiment of the present invention, specifically, when a number of subbands to be reported is increased to 4.

Referring to FIG. 6B, when the differential CQI is expressed with 3 bits, the outage probability is significantly high (i.e., 17%), whereas when the differential CQI is expressed with 4 bits (i.e., −8~7 dB), the outage probability is significantly low (i.e., 0.01%). In addition, when the differential CQI is expressed with 4 bits, an overhead required for CQI reporting is decreased by 16% from 25 bits to 21 bits. The number of all subbands, the number of subbands to be reported, a subband probability distribution, etc., are semi-static values that have an effect on a probability distribution of a channel. The number of times of transmitting these values may be generally about 1/10 of the case of CQI reporting. If it is assumed that 5 bits are required, similar to the case of CQI reporting since an offset value range is small but a high resolution is needed, an overhead required for overall CQI reporting is decreased by 23% in case of FIG. 6A and by 24% in case of FIG. 6B even if an additional signaling overhead is taken into account.

An offset value suitable for a probability distribution of another channel, as shown in FIG. 6A and FIG. 6B, can be determined by performing simulations or by using a mathematically modeled channel environment. Meanwhile, the offset value can be adaptively determined by utilizing a differential CQI encoding process. As a representative method, values indicating the number of times of performing encoding on a minimum differential CQI and the number of times of performing encoding on a maximum differential CQI are compared with each other. If a difference thereof is greater than or equal to a threshold, the offset value is adjusted by a preset value towards the larger value between the two compared values.

An MS can adjust and transmit the offset, or a receiving end (i.e., a Base Station (BS)) can determine the offset by comparing the transmitted values indicating the number of times of using the differential CQIs, and can transmit the determination result to the MS. In this case, it is enough to transmit only a variable of offset.

Referring again to FIG. 4, in step 409, the receiving apparatus subtracts the offset value determined in step 407 from the difference value determined in step 405, and then converts the result value into a bit-stream by performing quantization and encoding. That is, the receiving apparatus determines the differential CQI with respect to each transport layer according to Equation (2) below.

$$\text{Differential CQI of selected subband} = \text{CQI of selected subband} - \text{broadband CQI} - \text{offset} \quad (2)$$

If the differential CQI exists outside an expressible range, the differential CQI is saturated at an expressible minimum or maximum value and is then quantized. Mapping of Table 3 or Table 4 below are used to generate a bit-stream by using the differential CQI.

TABLE 3

| Differential CQI | Bit-stream |
|---|---|
| −8 | 1000 |
| −7 | 1001 |
| −6 | 1010 |
| −5 | 1011 |
| −4 | 1100 |
| −3 | 1101 |
| −2 | 1110 |
| −1 | 1111 |
| 0 | 0000 |
| 1 | 0001 |
| 2 | 0010 |
| 3 | 0011 |
| 4 | 0100 |
| 5 | 0101 |
| 6 | 0110 |
| 7 | 0111 |

TABLE 4

| Differential CQI | Bit-stream |
|---|---|
| 5 | 1000 |
| 7 | 1001 |
| 9 | 1010 |
| 11 | 1011 |
| −6 | 1100 |
| −8 | 1101 |
| −10 | 1110 |
| −12 | 1111 |
| 0 | 0000 |
| 1 | 0001 |
| 2 | 0010 |
| 3 | 0011 |
| −4 | 0100 |
| −3 | 0101 |
| −2 | 0110 |
| −1 | 0111 |

A scheme having a constant resolution, as shown in Table 3, is generally used. A scheme having a multiple resolution, as shown in Table 4, is used when a range of the differential CQI is large. In the selection of mapping, the mapping can be adaptively changed according to a channel characteristic. Since the mapping results can be obtained using a specific equation, the two cases can be implemented without having to store all mapping relations similarly to a lookup table. A mapping method may use a lookup table in order to map an arbitrary CQI onto a specific bit-stream.

In step 411, the receiving apparatus converts the differential CQI, which is converted into the bit-stream in step 409, into a transmission symbol, and transmits the converted transmission symbol to a transmitting end. Thereafter, the procedure of FIG. 4 ends.

Figure 5:
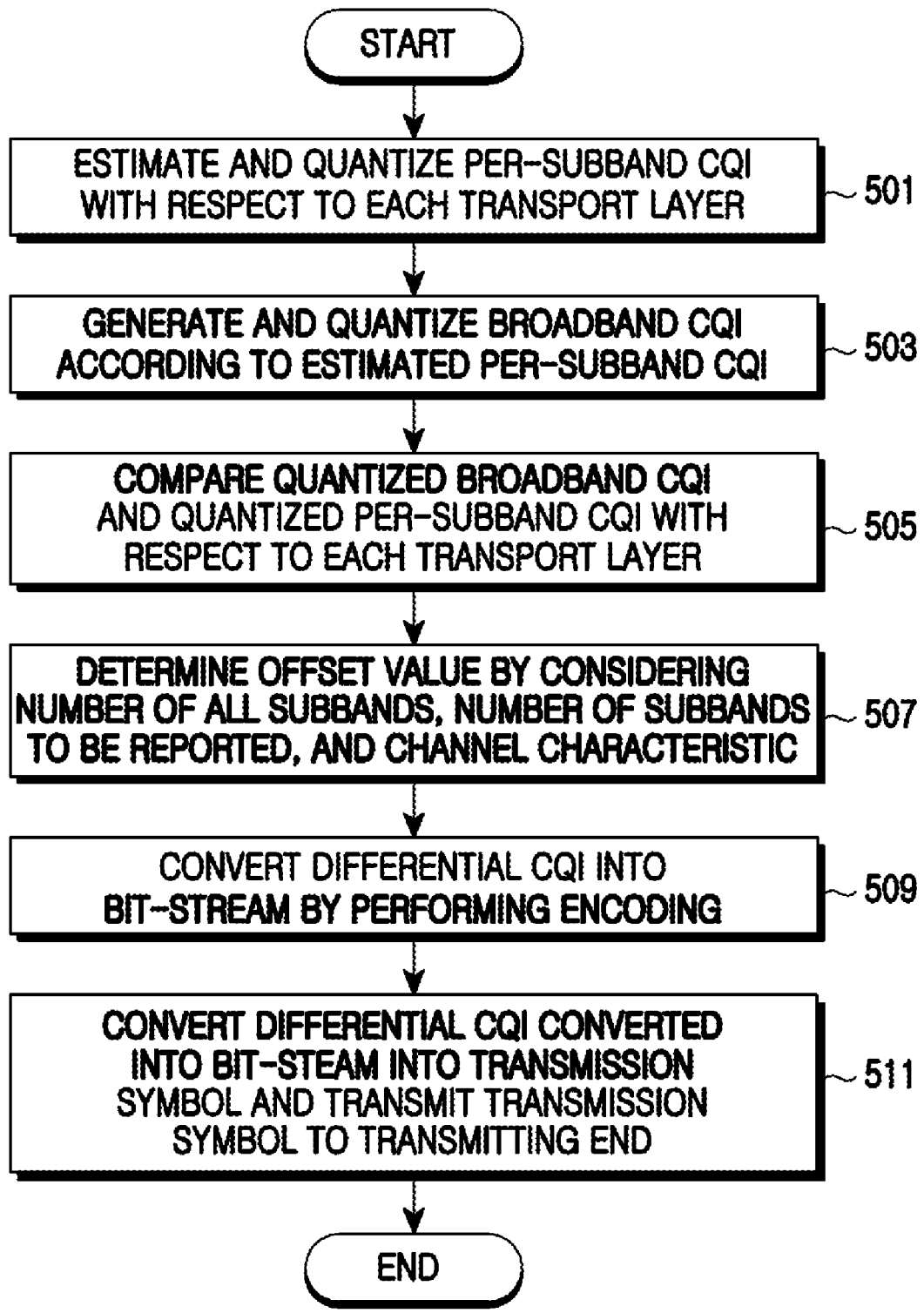
FIG. 5 is a flowchart illustrating a process of generating a differential CQI of a broadband CQI reference using an offset according to another exemplary embodiment of the present invention.

FIG. 5 is a flowchart illustrating a process of generating a differential CQI of a broadband CQI reference using an offset according to another exemplary embodiment of the present invention.

Referring to FIG. 5, a receiving apparatus estimates and quantizes a per-subband CQI with respect to each transport layer in step 501, and generates and quantizes a broadband CQI according to the estimated per-subband CQI in step 503.

In step 505, with respect to each transport layer, the receiving apparatus compares the quantized broadband CQI with the quantized per-subband CQI to determine a difference value thereof. In step 507, the receiving apparatus determines an offset value to be used in a differential CQI by considering the number of all subbands, the number of subbands to be reported, a channel characteristic, etc.

In step 509, the receiving apparatus subtracts the offset value determined in step 507 from the difference value determined in step 505, and then converts the result value into a bit-stream by performing quantization and encoding.

In step 511, the receiving apparatus converts the differential CQI, which is converted into the bit-stream, into a transmission symbol, and transmits the converted transmission symbol to a transmitting end. Thereafter, the procedure of FIG. 5 ends.

According to exemplary embodiments of the present invention, a differential CQI is generated irrespective of the speed of an MS and a correlation value between transport layers in an OFDMA system using multiple Tx/Rx antennas. Therefore, a signaling overhead of CQI transmission required to improve spectral efficiency can be reduced by using scheduling, AMC, etc., through adaptive changes according to a channel. Since a broadband CQI and a selected CQI have an offset and a high correlation irrespective of a channel characteristic, there is an advantage in that the number of bits required for a differential CQI can be reduced.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of generating a Channel Quality Indicator (CQI) in a receiving apparatus of a wireless communication system, the method comprising:
   estimating a per-subband CQI with respect to each transport layer;
   generating a broadband CQI with respect to each transport layer according to the per-subband CQI;
   comparing the broadband CQI and the per-subband CQI with respect to each transport layer to determine a difference value thereof;
   determining an offset value to be used in a differential CQI;
   determining the differential CQI by subtracting the offset value from the determined difference value; and
   transmitting a transmission symbol by converting the determined differential CQI into the transmission symbol,
   wherein the determining of the offset value comprises adaptively determining the offset value by comparing a value indicating the number of times of performing encoding on a minimum differential CQI with a value indicating the number of times of performing encoding on a maximum differential CQI, and, if a difference thereof is greater than or equal to a threshold, adjusting the offset value by a preset value towards the larger value between the two compared values.

2. The method of claim 1, wherein the broadband CQI comprises at least one of a representative CQI for an entire system band, a representative CQI for a band excluding subbands in which CQIs are individually delivered for scheduling, and a representative CQI for a subset of the band.

3. The method of claim 2, wherein the representative CQI comprises a value that represents a throughput of a band and that is related to a CQI.

4. The method of claim 3, wherein the value that represents the throughput of the band comprises at least one of a Signal-to-Interference and Noise Ratio (SINR) and a Modulation and Coding Scheme (MCS) level and further wherein the value that is related to the CQI comprises at least one of an average value of subband CQIs and a median value thereof.

5. The method of claim 1, wherein the determining of the offset value comprises considering at least one of the number of all subbands, the number of subbands to be reported, and a channel characteristic.

6. The method of claim 1, wherein the offset value varies depending on each transport layer and is determined so that the offset value reduces a range of the differential CQI of the subband to be reported.

7. The method of claim 1, wherein the offset value varies depending on changes in a presumed channel probability distribution.

8. The method of claim 1, further comprising quantizing the broadband CQI and the Per-subband CQI, wherein, the quantized values are utilized to obtain a per-subband differential CQI based on the broadband CQI with respect to each transport layer using an offset.

9. A receiving apparatus for generating a Channel Quality Indicator (CQI) in a wireless communication system, the apparatus comprising:
   a CQI estimator for generating a broadband CQI with respect to each transport layer according to a per-subband CQI by estimating the per-subband CQI with respect to each transport layer, for comparing the broadband CQI and the per-subband CQI with respect to each transport layer to determine a difference value thereof, and for determining a differential CQI based on an offset value to be used in the differential CQI; and
   a CQI generator for generating a CQI to be transmitted to a transmitting end by using the determined differential CQI,
   wherein the offset value is adaptively determined in a differential CQI encoding process, and in the differential CQI encoding process, values indicating the number of times of performing encoding on a minimum differential CQI and the number of times of performing encoding on a maximum differential CQI are compared with each other, and if a difference thereof is greater than or equal to a threshold, the offset value is adjusted by a preset value towards the larger value between the two compared values.

10. The apparatus of claim 9, wherein the differential CQI is determined by subtracting the offset value from the determined difference value.

11. The apparatus of claim 9, wherein the broadband CQI comprises at least one of a representative CQI for an entire system band, a representative CQI for a band excluding subbands in which CQIs are individually delivered for scheduling, and a representative CQI for a subset of the band.

12. The apparatus of claim 11, wherein the representative CQI is a value that represents a throughput of a band and that is related to a CQI.

13. The apparatus of claim 12, wherein the value that represents the throughput comprises at least one of a Signal-to-Interference and Noise Ratio (SINR) and a Modulation and Coding Scheme (MCS) level and further wherein the value that is related to the CQI comprises at least one of an average value of subband CQIs and a median value thereof.

14. The apparatus of claim 9, wherein the offset value is determined by considering at least one of the number of all subbands, the number of subbands to be reported, and a channel characteristic.

15. The apparatus of claim 9, wherein the offset value varies depending on each transport layer and is determined so that the offset value reduces a range of the differential CQI of the subband to be reported.

16. The apparatus of claim 9, wherein the offset value varies depending on changes in a presumed channel probability distribution.

17. The apparatus of claim 9, wherein the broadband CQI and the per-subband CQI are first quantized and the quantized value is utilized to obtain a per-subband differential CQI based on the broadband CQI with respect to each transport layer using an offset.

* * * * *